INVENTOR.
REINHOLD A. PEARSON

Sept. 26, 1967  R. A. PEARSON  3,343,335
APPARATUS FOR SETTING UP AND FILLING CARTONS
Filed May 17, 1965  15 Sheets-Sheet 2

INVENTOR.
REINHOLD A. PEARSON
BY
ATTYS.

Sept. 26, 1967 R. A. PEARSON 3,343,335
APPARATUS FOR SETTING UP AND FILLING CARTONS
Filed May 17, 1965 15 Sheets-Sheet 10

INVENTOR.
REINHOLD A. PEARSON
BY
ATTYS.

Sept. 26, 1967  R. A. PEARSON  3,343,335
APPARATUS FOR SETTING UP AND FILLING CARTONS
Filed May 17, 1965  15 Sheets-Sheet 11

INVENTOR.
REINHOLD A. PEARSON
BY
ATTYS.

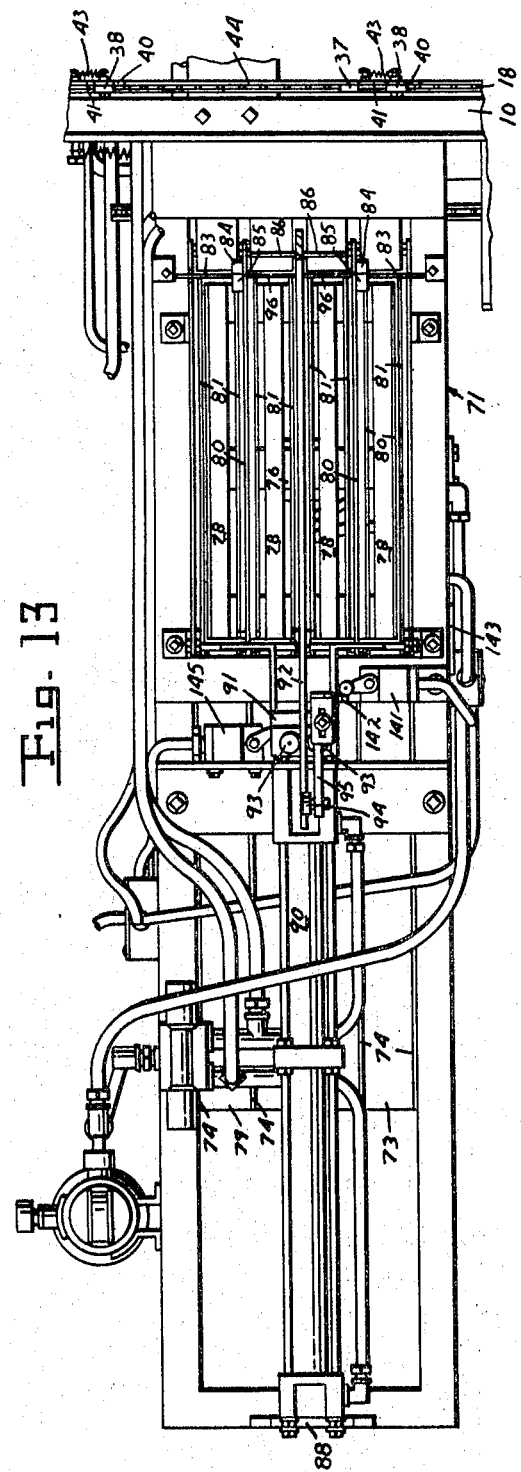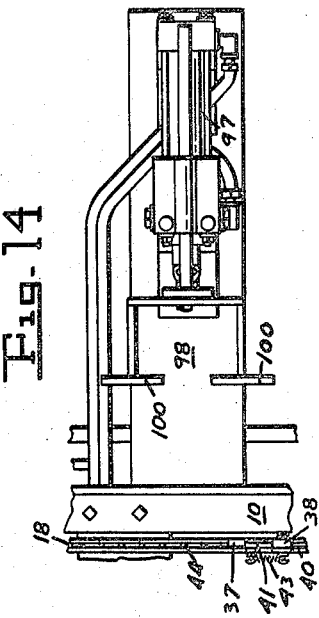

Sept. 26, 1967   R. A. PEARSON   3,343,335
APPARATUS FOR SETTING UP AND FILLING CARTONS
Filed May 17, 1965   15 Sheets-Sheet 13

INVENTOR.
REINHOLD A. PEARSON
BY
ATTYS.

Sept. 26, 1967   R. A. PEARSON   3,343,335
APPARATUS FOR SETTING UP AND FILLING CARTONS
Filed May 17, 1965   15 Sheets-Sheet 14

INVENTOR.
REINHOLD A. PEARSON
BY
ATTYS.

INVENTOR.
REINHOLD A. PEARSON
ATTYS.

United States Patent Office 3,343,335
Patented Sept. 26, 1967

3,343,335
APPARATUS FOR SETTING UP AND
FILLING CARTONS
Reinhold A. Pearson, S. 12 Division St.,
Spokane, Wash. 99202
Filed May 17, 1965, Ser. No. 456,332
21 Claims. (Cl. 53—186)

This invention relates to a machine for setting up collapsible paperboard cartons and filling them with a charge of containers such as bottles.

The present invention is concerned with the automatic handling of collapsed carton blanks which are to be filled with a charge of bottles and glued prior to shipment. The machine is designed to accomplish the necessary handling of both the cartons and the bottles, relating the various actions involved in a comparatively simple and compact mechanism.

The cartons with which the apparatus is concerned are those used in the beverage industries, particularly in the packaging of beer. The cartons are self-erecting, being open at each end to receive two or more rows of containers at the interior of each carton. The two ends of the carton must then be sealed to complete the package. The apparatus is designed for use with bottles, but could also be utilized for handling cans.

It is a first object of this invention to provide a very simple mechanism for setting up cartons in pairs so as to double the capacity of the bottles handled by the machine and to provide an apparatus capable of handling the output of a high speed bottling line.

Another object of this invention is to provide a unique conveyor for intermittently moving cartons between various stations on a supporting framework so that the operations required to complete the filling and handling of each carton can be accomplished on a single machine at the several stations.

Another object of this invention is to provide a simplified container handling apparatus for preparing a charge of containers prior to placement of the containers within cartons. The same apparatus is utilized to deliver the charge of containers into the cartons in proper position.

Another object of this invention is to relate the handling and filling of the cartons to the glueing of the end flaps, so that the final product emerging from the machine is a completed package of containers. All of the various operations necessary are accomplished on one machine in a timed relation, the operation being actuated only when the cartons and bottles are in proper position.

These and further objects will be evident from the following disclosure, taken together with the accompanying drawings, which illustrate a preferred form of the invention. Since a great deal of detail is required in order to fully understand the operation of the machine, it is necessary to point out that the mechanical and electrical details illustrated are not necessarily required in the practice of this invention, the invention being defined in the claims that follow the detailed specification.

In the drawings:

FIGURE 4 is an elevation view of the apparatus as seen from the right in FIGURE 2;

FIGURE 13 is an enlarged fragmentary view of the bottle loading apparatus as seen along line 13—13 in FIGURE 2;

FIGURE 14 is an enlarged fragmentary sectional view taken along line 14—14 in FIGURE 2, showing the carton interior blocking apparatus;

FIGURE 16 is a view similar to FIGURE 5 showing the operation of the carton handling mechanism;

FIGURE 17 is a view taken substantially along line 17—17 in FIGURE 15, showing the loading of bottles into a pair of cartons;

FIGURE 18 is a view taken substantially along line 18—18 in FIGURE 15, showing bottles prior to being loaded into a carton; and FIGURE 19 is a view similar to FIGURE 15 showing the preparation of a charge of bottles prior to loading.

Figure 1:
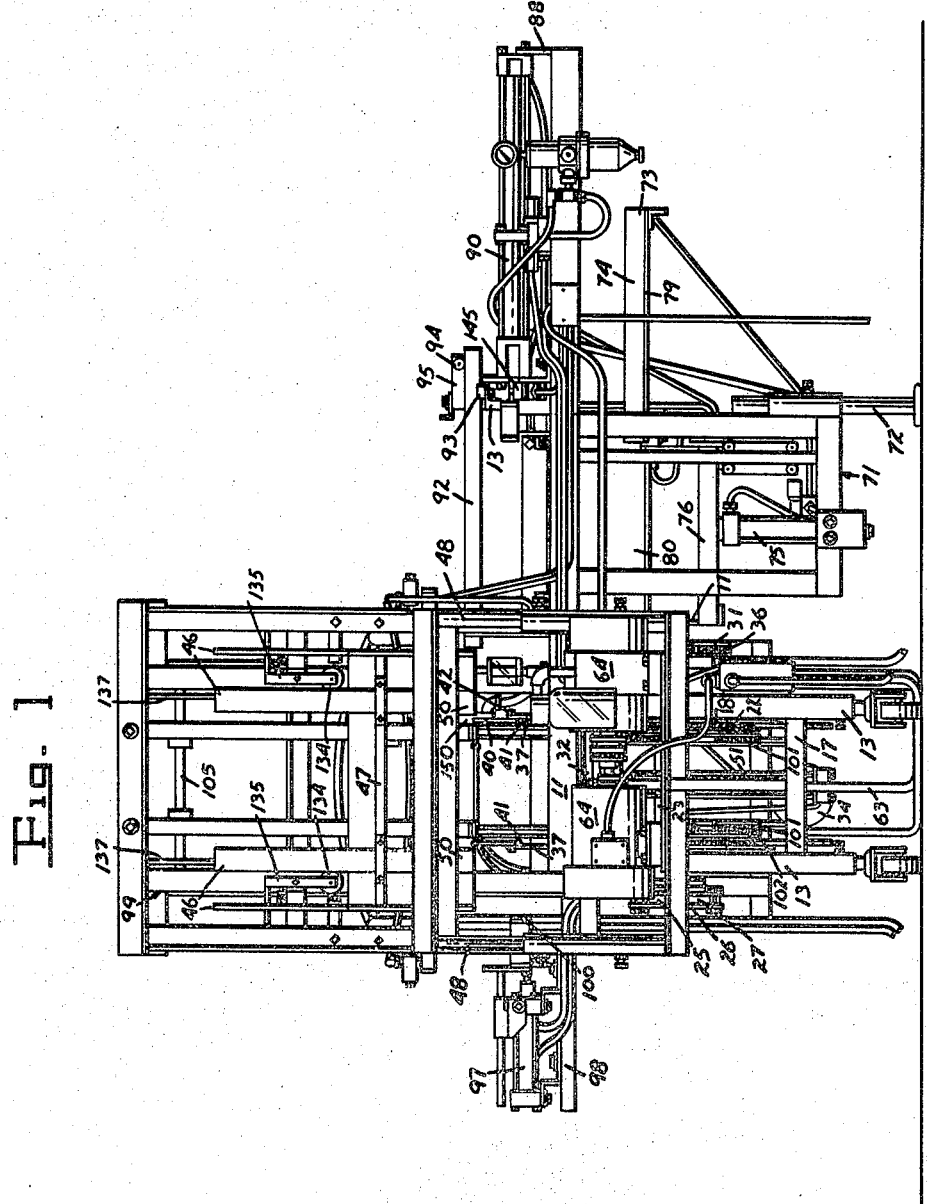
FIGURE 1 is an end view of the machine as viewed from its rear end.

The machine described below is actually a complex of several different mechanisms, all of which cooperate with one another to store and expand cartons, to intermittently move the cartons between operating stations on the supporting framework, to arrange containers prior to filling of the cartons, to fill the cartons with containers, to seal the ends of the cartons and to deliver them from the machine. These various mechanisms will be described in the order of the operations carried out on a carton, with the interrelationship between the various mechanisms being described in a sequence relating to the operation of the machine.

The basic machine structure can best be understood from FIGURES 1 through 5, which show overall views of the apparatus. The machine is carried on a rigid supporting framework basically comprising a narrow longitudinal open table having a rectangular configuration. This table is bounded by side longitudinal members 10, a connecting rear end member 11 and a front end member 12. The corners formed by the members 10, 11 and 12 are supported by rear posts 13 and front posts 14. In addition, there is provided an intermediate longitudinal member 15 at each side of the machine, the members 15 including angular sections denoted as 16 required in order to provide the necessary clearance and structural support for the interior mechanism. The posts 13 and 14 are braced adjacent their lower ends by transverse braces 17.

Figure 5:
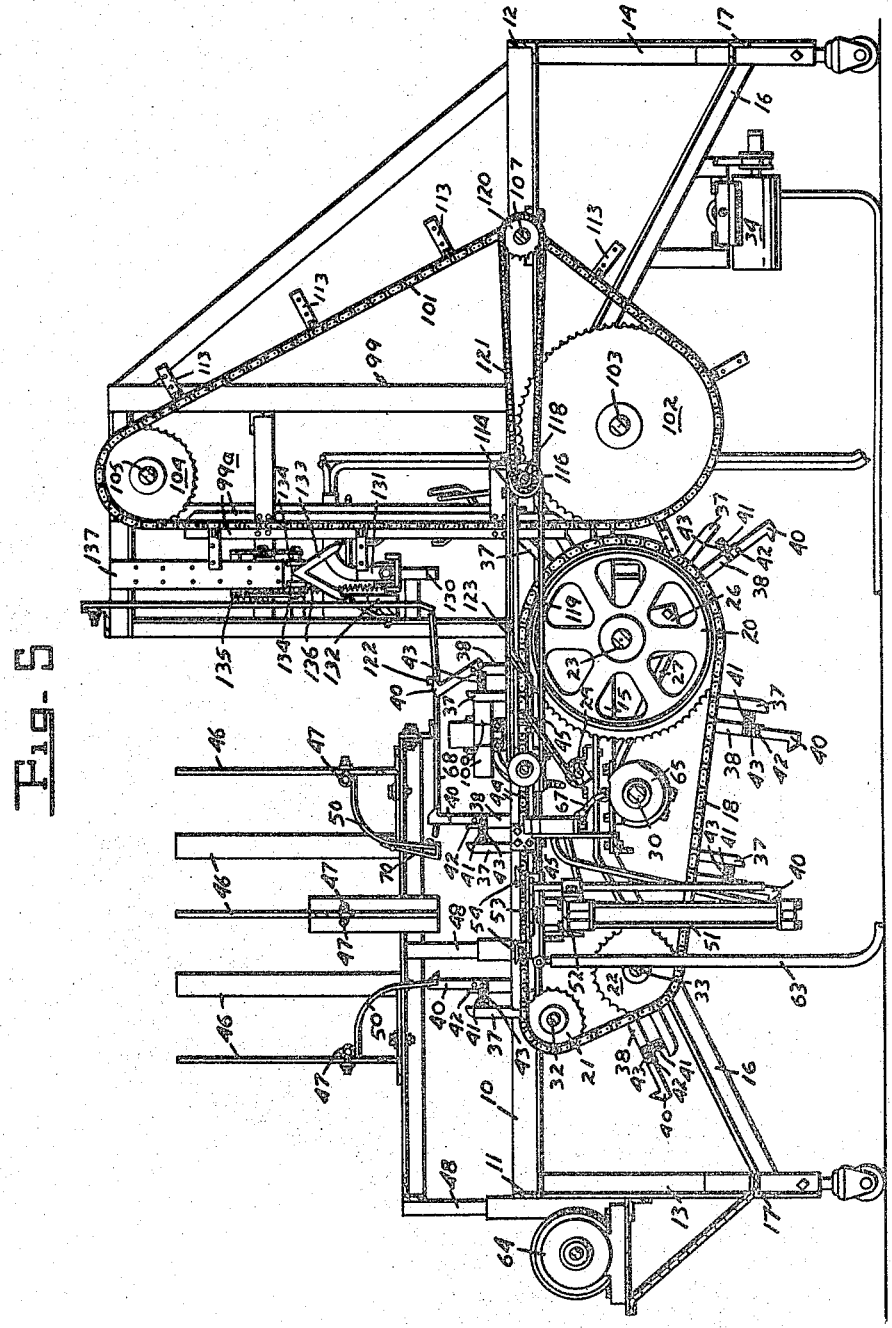
FIGURE 5 is a vertical sectional view of the apparatus as seen along line 5—5 in FIGURE 2.
Figure 6:
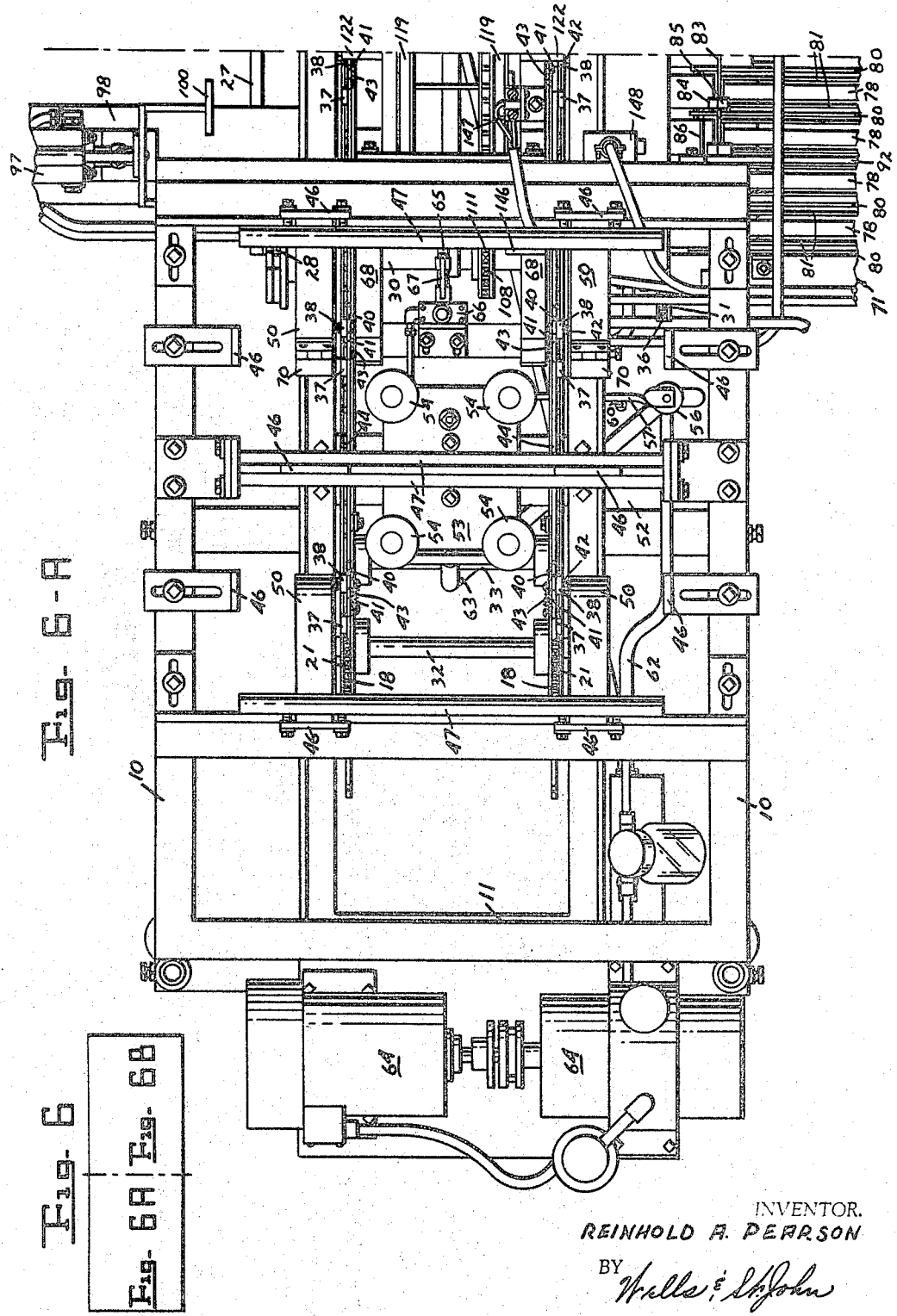
FIGURE 6 is an enlarged fragmentary top view of the carton handling apparatus, FIGURE 6A showing the rear portion of the machine and FIGURE 6B showing the front portion of the machine, portions of the carton loading apparatus being broken away.
Figure 7:
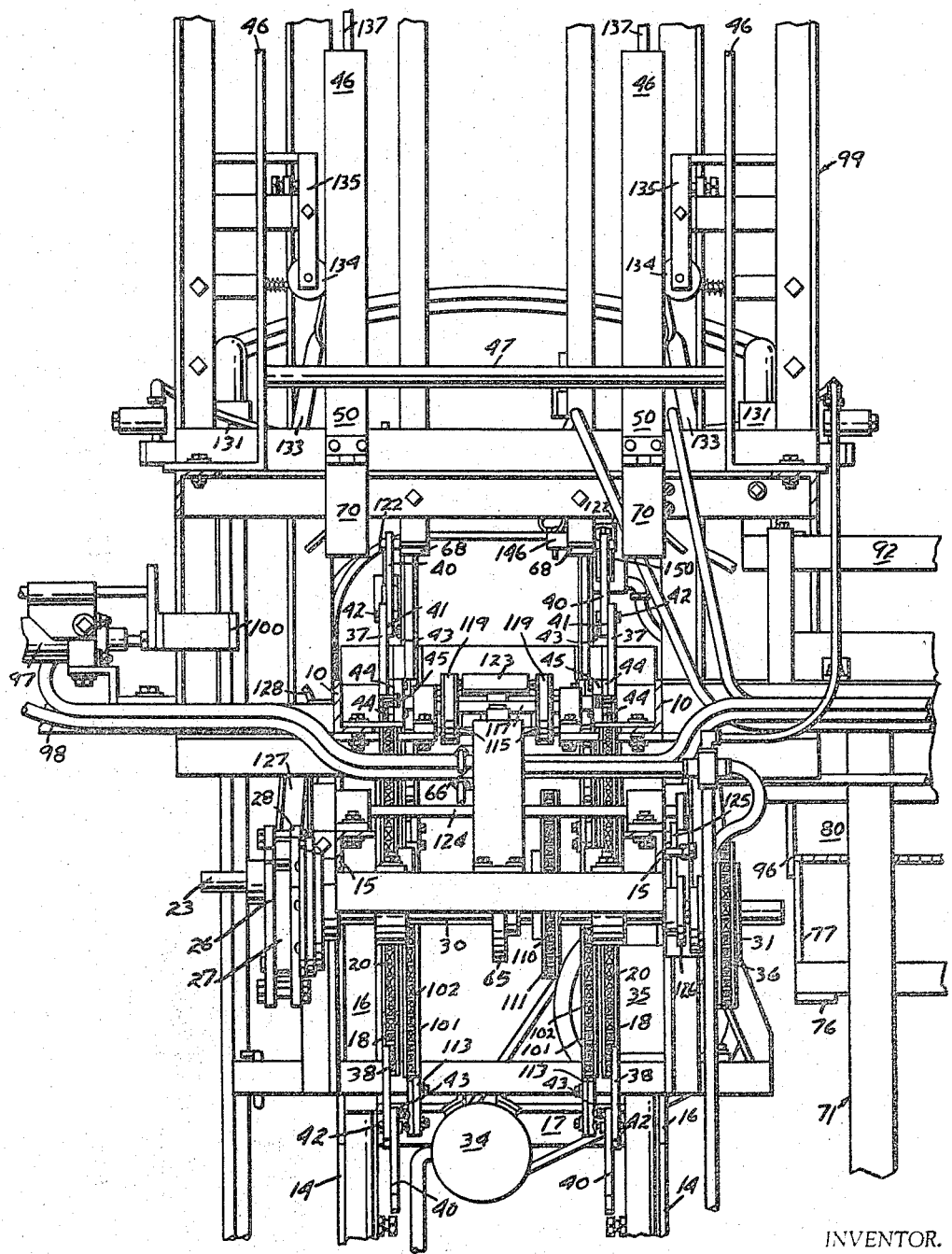
FIGURE 7 is an enlarged fragmentary sectional view of the carton handling mechanism taken along line 7—7 in FIGURE 3.

The designation front and rear as used in this specification shall refer to the general direction of movement of the articles handled thereby, the rear of the machine being shown to the left in FIGURE 5 and the front of the machine being shown to the right.

Intermittently moving conveyor

The main conveyor of the machine, on which the carton blanks are placed and moved from one operating station to the next, can best be understood from the showing of FIGURES 1 through 8. It basically comprises a conveyor made of two transversely spaced endless chains with specially designed support posts for grasping and positioning expanded cartons thereon. The lower surfaces of the cartons do not rest on the chains, but are supported on the upper edges of the longtiudinal members 10.

The conveyor chains 18 are located directly adjacent to the longitudinal members 10 at the two respective sides of the machine. They are entrained over large forward sprockets 20 fixed to a mounting shaft 23, upper rear sprockets 21 fixed to a shaft 32, and lower rear sprockets 22 fixed to a shaft 33. The shafts 23, 32 and 33 are each suitably mounted by bearings on the rigid supporting framework.

Figure 4:
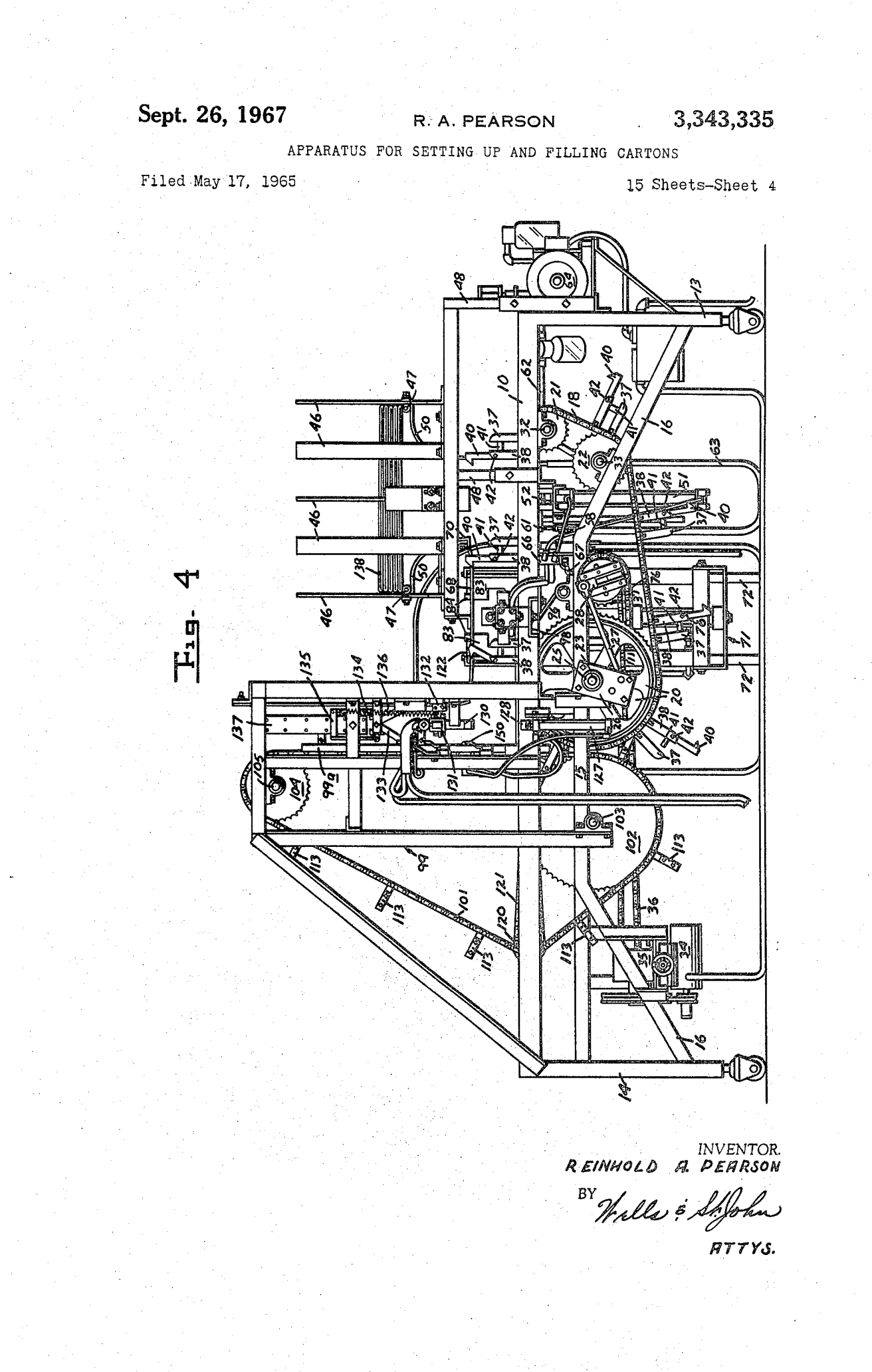

The mechanism by which intermittent movement is imparted to the chains 18 through large forward sprockets 20 can best be understood from FIGURE 4. At the side of the machine shown in FIGURE 4 there is mounted on the shaft 23 an inner ratchet member 25 surrounded by an outer ratchet member 26. The two members 25 and 26 are interconnected in such a manner that only rotational motion about the axis of shaft 23 in a counterclockwise direction as seen in FIGURE 4 will be imparted from the outer member 26 to the inner member 25. The inner member 25 will remain stationary during clockwise movement of the outer member 26. Since such ratchet members are conventional, no further description of the details of this mechanism is believed to be necessary.

The outer ratchet member 26 is oscillated through a connecting link 27 pivotally connected at each of its ends, one end being connected to member 26 and the other being connected to a radially adjustable crank 28 (FIGURE 4). The crank 28 is fixed to a main cross shaft 30 powered by a driven sprocket 31 at the opposite side of the machine (FIGURE 3).

Figure 3:
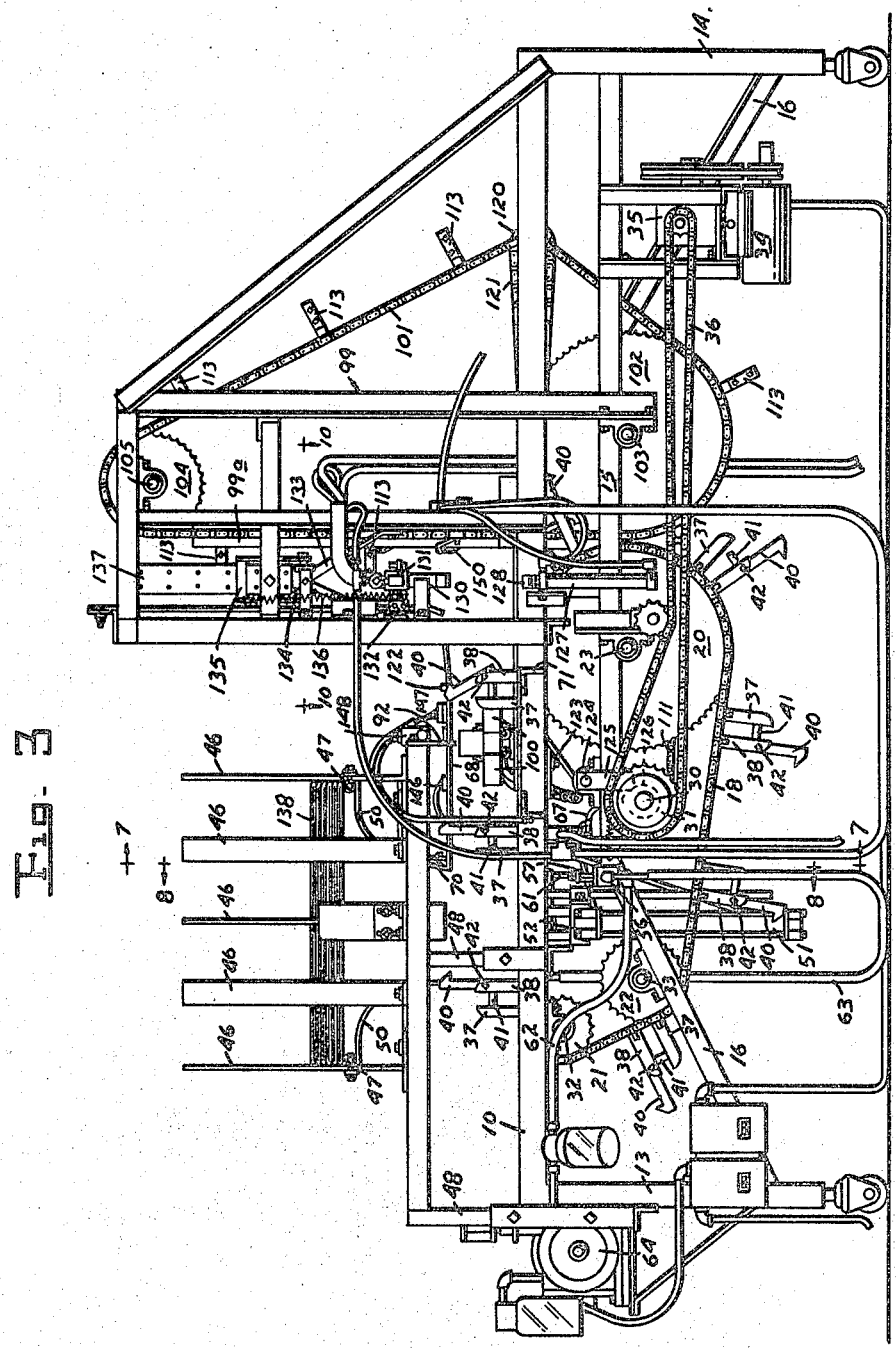
FIGURE 3 is a sectional elevation view of the machine as seen along line 3—3 in FIGURE 2.

A driving motor 34 at the front of the machine powers the main control shaft 30 through a transmission 35 and driving chain 36 that extends along the side of the machine illustrated in FIGURE 3 to the driven sprocket 31.

The purpose of the conveyor just described is to intermittently propel paired rectangular cartons along the length of the framework. In order to maintain these cartons in their expanded condition, it is necessary to abut the respective pairs of cartons at both their front and rear edges with posts perpendicular to the surfaces of the longitudinal members 10 on which the cartons rest. There are provided front posts 37 and rear posts 38 fixed to individual chain links of the respective chains 18. The posts 37 and 38 project in a direction perpendicular to the chain links on which they are fixed and are independent of each other.

Figure 9:
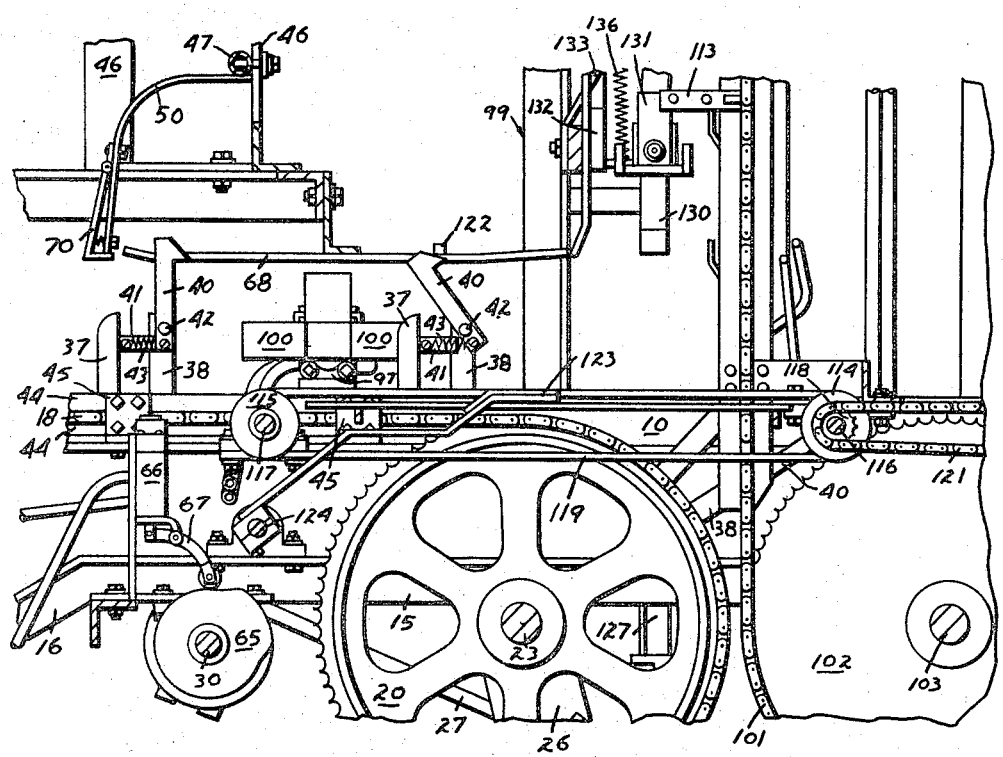
FIGURE 9 is an enlarged fragmentary sectional view taken along line 9—9 in FIGURE 2, showing the transfer mechanism for carton handling.

Each front post 37 is simply an upright metal bar having a rounded top surface so as to facilitate downward movement of a front carton surface along its rear edge. Each rear post 38 carries a hook 40 pivoted to the post 38 at 42. Projecting rearwardly from each rear post 38 is a short extension 41 located below the pivot 42 and having a tension spring connected between its rear end and the lower end of the hook 40 on each post 38. This structure is best seen in FIGURE 9. The purpose of the extension 41 is to provide a mount for the spring 43. It also provides a front abutting surface that limits pivotal movement of each hook 40 due to spring 43 to a position as shown in the drawings wherein the vertical front surface of the hook 40 is aligned as a smooth extension of the vertical front surface of the post 38. However, the individual hooks 40 are free to pivot in a counter-clockwise direction as can be seen in FIGURE 9, the manner by which this is accomplished being described below.

Extending along the upper flights of the chains 18 is a fixed longitudinal inner support bar 44 at the inside of each chain 18, supported by longitudinally spaced brackets 45 mounted on the members 10. The upper surface of each bar 44 is in the same plane as the upper surfaces of the members 10 and provides a parallel supporting edge for the cartons as they are pushed along the upper flights of the chains 18. The height of the hooks 40 is such that they extend over the top rear corner of each carton in abutment with the rear post 38. For reference, this can be better understood by viewing the more simple schematic drawing of FIGURE 16.

Carton storage and feeding mechanism

The apparatus illustrated in the drawings is shown as it would be designed for the filling of paired cartons, each carton being capable of holding 12 bottles, the pair of cartons therefore handling 24 bottles. Each pair of expanded cartons is to fit between a set of front posts 37 and rear posts 38 on the previously described conveyor.

Carton blanks, in collapsed condition, are stored as shown in FIGURE 3 in a hopper at the rear of the machine bounded by upright guides 46 that cooperatively form two storage areas longitudinally adjacent to one another. The cartons are vertically positioned in an upright stack, the lower carton in each stack resting on transverse rods 47 fixed across the lower portions of the respective guides 46 (FIGURE 5). The upright guides 46 are located in fixed positions on the framework, being supported by a rigid structure on upright posts 48.

The cartons with which this device is utilized are preferably self-opening cartons, being opened by merely pulling the walls of the cartons to a rectangular configuration. This is accomplished by means of front and rear curved forming plates 50, best seen in FIGURES 5 and 8. The forming plates 50 extend across the lower portion of each of the two hoppers to gradually urge each carton to a rectangular upright position as it is pulled downwardly against the respective plate 50 with which the carton is in contact. The opposite sides of the two cartons will contact one another, the cartons being formed adjacent to one another in the manner diagrammatically shown in FIGURE 16.

The forward forming plates 50 are provided with protruding spring biased plates 70 that compress to permit the forward carton of each pair to pass. The plates 70 then spring back rearwardly to project above the upper front corner of the respective forward carton after it has passed the plate 70. This serves to temporarily guide the upper surface of the forward carton, as it is being placed against the front posts 37 on the intermittently moving conveyor. The upper rear corner of the carton pair will be held by the spring biased hooks 40 previously described and the carton, after forward movement of chains 18, will pass beneath retaining strips 68 on the framework.

The cartons are pulled from the storage stacks by means of a double acting pneumatic cylinder assembly 51 fixed on the framework by means of a bracket 52. The cylinder assembly 51 includes a vertically reciprocable piston rod that carried a horizontal plate 53. Mounted on plate 53 are four upwardly directed vacuum cups 54 arranged in transversely oriented pairs. Cups 54 are adapted to contact the lower panel of the two respective cartons located above them in the storage hopper.

Figure 8:
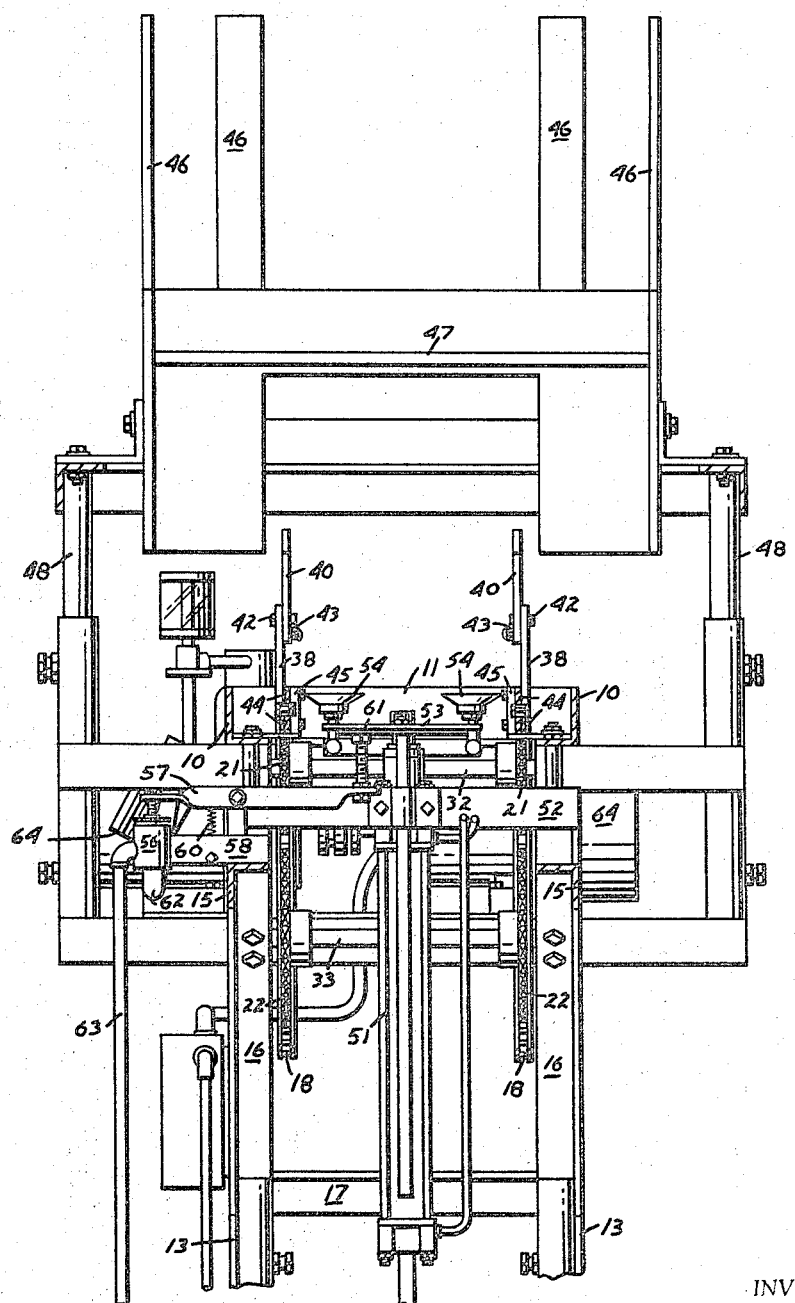
FIGURE 8 is an enlarged fragmentary sectional view taken along line 8—8 in FIGURE 3.

Vacuum pressure to cups 54 is provided through a connecting hose 63 that leads to a vacuum breaker 56 (FIGURE 8). The vacuum breaker 56 has a movable closure 57 formed as a lever pivotally connected to a common mounting bracket 58 for both the closure 57 and the body of the vacuum breaker 56. Closure 57 is biased to a closed position by a tension spring 60. At the end thereof opposite to the vacuum breaker 56, the closure 57 is provided with an upright contact bolt 61 which is vertically adjustable and adapted to be contacted by the lower surface of the horizontal mounting plate 53 for cups 54. The adjustment of the bolt 61 is such that vacuum pressure to the connecting hose 63 will be broken by movement of closure 57 just as the cups 54 have brought the paired cartons into place between the respective posts 37 and 38 of the stationary conveyor chains 18.

Vacuum can be supplied to the vacuum breaker 56 from any conventional source, either on the machine or from an exterior source. In the illustrated example, a supply hose 62 for vacuum breaker 56 is connected to a pump and motor unit 64 on the framework.

Figure 16:
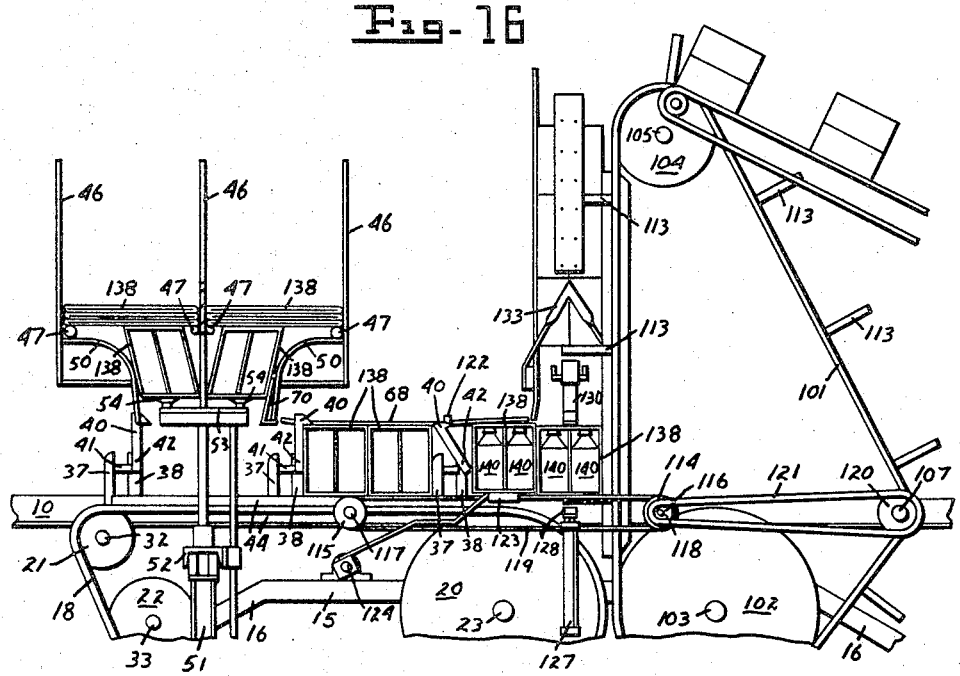
FIGURES 16 through 19 are a series of schematic views illustrating the operation of the machine.

The movement of the cylinder assembly 51 required to bring a pair of cartons downwardly between the forming plates 50 and into position between posts 37 and 38 is accomplished in a timed relation relative to movement of the chains 18. It is accomplished during the period in which the chains 18 are stationary, the timing of chains 18 being such that the posts 37 and 38 will be properly located beneath the upright guides 46 for reception of a pair of cartons between them. This timing is accomplished by a cam 65 on the main shaft 30 (FIGURE 5). Cam 65 operates a valve actuator 67 pivotally mounted on a control valve 66 for the double acting hydraulic cylinder 51. The cam 65 has a single raised area or lobe which will cause valve 66 to raise the plate 53 to an upper position in contact with the lowermost carton in each stack of carton blanks carried between the upright guides 46. When the valve actuator 67 has cleared this lobe, the valve 66 will be reversed, lowering the plate 53. As described, when the plate 53 again reaches its lowermost position, the movable closure 57 on the vacuum breaker 56 will be opened and the vacuum pressure will be released. At this time, the chains 18 will again move forward one complete step, the stations at which the cartons are held in a fixed position being as shown in FIGURES 5 and 16.

*Container arranging and delivery mechanism*

After the paired cartons have been pulled from the storage hoppers, they are moved by the intermittent conveyor to an adjacent station on the supporting framework at which the cartons are again held stationary for a period of time. At this second station, the pair of cartons, having open flaps at each end, are filled with four rows of bottles or other containers. The apparatus that accomplishes the arranging of the containers prior to delivery of the containers to the interior of the cartons is best seen in FIGURES 12 through 15. The general apparatus can also be seen in FIGURES 1 and 2.

Figure 18:
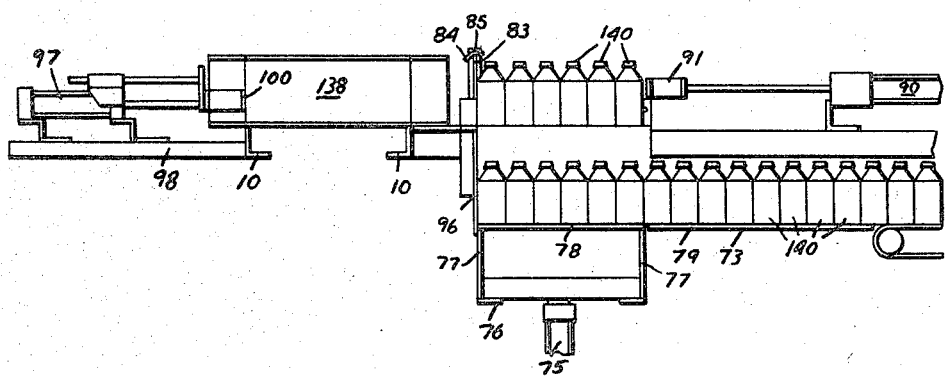

The container handling apparatus is mounted on a rigid rectangular frame 71 that is fixed to the previously described framework, the outer end of the rectangular frame 71 being supported on posts 72. It includes an intermediate conveyor extension 73 that protrudes outwardly from the machine, having a horizontal platform 79 with upright parallel dividers 74 extending longitudinally to form four channels through which containers are pushed inwardly toward the machine by a delivery conveyor system (not shown). The containers will be moved inwardly across the platform 79 in the manner shown in FIGURE 18, each container pushing that before it so that the containers abut one another.

Figure 15:
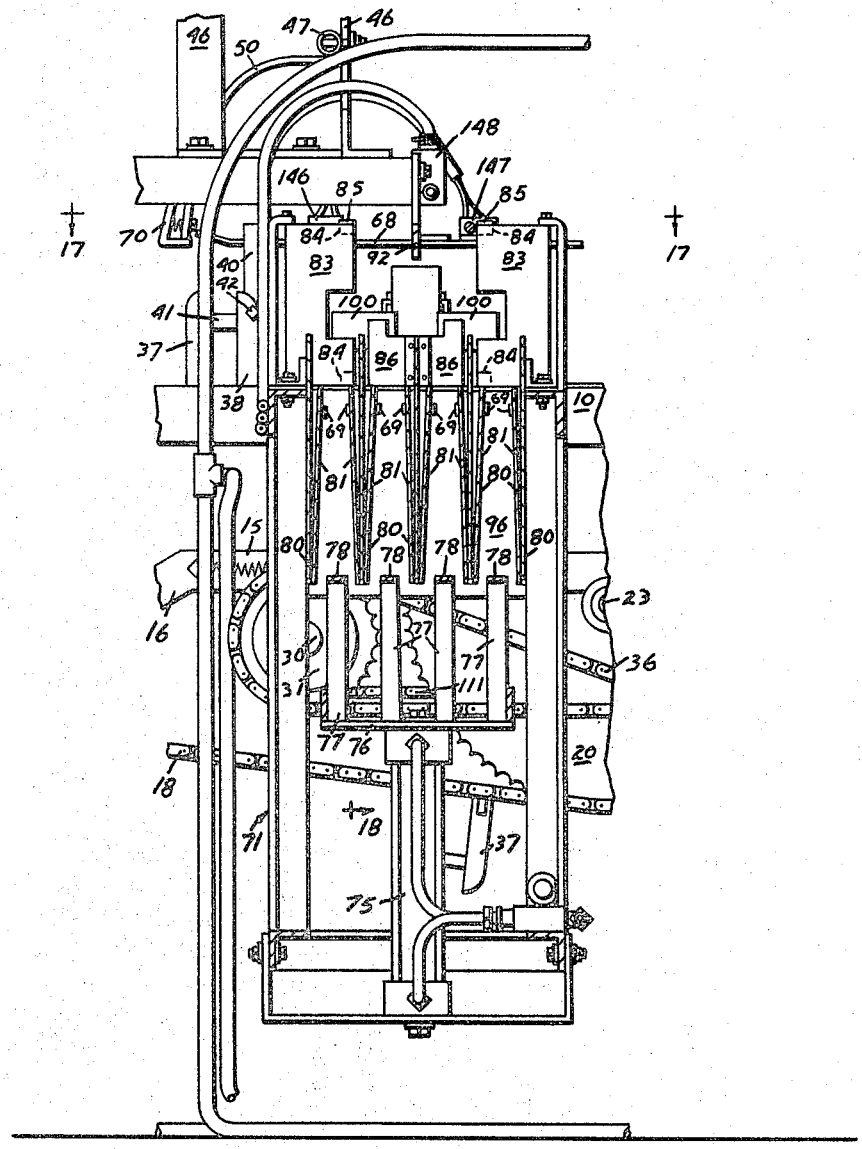
FIGURE 15 is an enlarged sectional view through the bottle loading apparatus as seen along line 15—15 in FIGURE 2.

Within the rectangular frame 71 is a vertically movable double acting cylinder assembly 75, fixed at its base to the frame 71 (FIGURE 15). At the upper end of the piston rod for the cylinder assembly 75 is fixed a horizontal elevator 76 that carries four transversely spaced uprights 77 at both the outer and inner ends thereof. At the upper end of each upright 77 is a longitudinal horizontal bar 78 having a width less than the separation between the dividers 74 on the conveyor extension 73. The horizontal bars 78, when the cylinder assembly 75 is retracted, have their upper surfaces in the same plane as the upper or supporting surface of the conveyor extension 73 and serve as a vertically movable extension of the conveyor extension 73. When in its lowered condition, the cylinder assembly 75 permits containers to be pushed inwardly from the conveyor extension 73 onto the respective bars 78. A fixed vertical plate 96 on frame 71 limits inward motion of containers.

Fixed longitudinally within the rectangular frame 71 are five downwardly extending dividers 80 (FIGURE 15). Each divider 80 corresponds to the previously described dividers 74 to define four longitudinal channels for guiding the containers received between them. The dividers 80 extend downwardly to an elevation at which they will protrude substantially below the top surfaces of containers resting on the lowered horizontal bars 78. They extend upwardly to an elevation coplanar with the top edges of the bars 44 and members 10 previously described.

Mounted along the inner surfaces of the dividers 80 are hinged plates 81, located in inwardly facing pairs between each adjacent pair of dividers 80. The hinged plates 81 protrude only partially across the space between the respective paired dividers 80, the separation between the plates 81, when in their inwardly biased positions, being slightly greater than the width of the respective bars 78. The normal position of plates 81 is governed by stops 69 on plates 96. The bars 78 and containers supported thereon are therefore free to pass between the plates 81. The plates 81 are biased to the horizontal position shown in FIGURE 15 by like tension springs 87 (FIGURE 12) that are connected between cooperatively paired hinged plates 81 on the fixed dividers 80. The hinged plates 81 are free to swing outwardly when contacted by containers resting on the horizontal bars 78.

Basically, containers are pushed inwardly along the conveyor extension 73 and onto the horizontal bars 78. Inward movement of containers is limited by vertical plate 96. Containers are intermittently elevated by actuation of cylinder assembly 75 to cause the bars 78 to rise between hinged plates 71. Outer uprights 77 prevent further inward movement of containers resting on the conveyor extension 73 during elevation of a charge of containers. The containers are pushed above the top edges of hinged plates 81, which then return to their normal angular positions and vertically support each row of containers. After the cylinder assembly 75 has returned to its retracted or lowered position, another charge of containers is pushed onto the bars 78 in preparation for lifting.

After the containers have been elevated to a position supported on the hinged plates 81, they must be pushed inwardly to the erected cartons held in place on the main framework. This pushing action is accomplished by a horizontal cylinder assembly 90 fixed to an outwardly protruding frame extension 88 that is rigid with and forms a part of the frame 71. The double acting pneumatic cylinder assembly 90 has a reciprocable piston rod with a pusher element 91 at the outer end thereof (FIGURE 13). Pusher element 91 is guided by a fixed longitudinal bar 92 located above the hinged plates 81 at the center of the container forming area on frame 71. Element 91 is guided by side rollers 93 (FIGURE 13) and a top roller 94 mounted on a bracket 95, the rollers 93, 94 being in contact with the respective edges of the bar 92. The inner surface of the pusher element 91 is adapted to contact tangentially containers on the hinged plates 81 so as to selectively push such containers toward the main framework of the machine when the cylinder assembly 90 is actuated.

Containers moved by actuation of cylinder assembly 90 must move inwardly to the interior of open carton pairs held on the intermittently movable conveyor. Since these containers must pass through the open end flaps facing the frame 71, it is preferable to provide some apparatus for ensuring that the containers do not become entangled with the flaps. This is accomplished by means of pivoted outer gates 83, best seen in FIGURE 15 and also in FIGURES 12 and 13. The outer gates 83 have top and bottom inner flanges 84 that protrude angularly toward the center of the gate 83 to permit contact with the upper and lower flaps of the respective carton pairs so as to force these flaps slightly outwardly. The upper edge of each gate 83 also has an outer flange 85 protruding toward the cylinder assembly 90 to ensure smooth contact with the upper carton flaps.

There also are provided smaller inner gates 86 that can pivot inwardly and hold the adjacent vertical flaps between the two cartons. The pivotal axis of each inner gate 86 is slightly outward from the pivotal axis of the respective outer gates 83. Therefore, bottles being pushed outwardly by action of the cylinder assembly 90 will first contact the outer gates 83, so that initial pivotal movement of the gates 83 will first separate the upper and lower carton flaps due to contact by the flanges 84. Then the inner gates 86 will be pivoted to ensure smooth passage of the containers past the outer edges of the abutting vertical flaps at the center of the paired cartons. After the containers have passed the gates 83, 84, the gates will return to their transverse positions as shown in the drawings due to the spring biased hinges by which they are mounted on the frame 71.

In order to provide a positive limit to the inward movement of containers within the expanded pairs of cartons, there is provided an auxiliary cylinder 97 at the opposite side of the machine. The cylinder 97 (FIGURE 14) is mounted on a fixed frame extension 98 and has positioning plates 100 fixed at the outer end of its piston rod. The positioning plates 100 are movable from a position clear of the framework to a position inside the paired cartons held at the second stationary station along chains 18, the inner surfaces of the plates 100 being flush with the outside carton edges, or at the inner edges of the unfolded flaps. The containers will therefore not pass beyond the plates 100 and will be positively located in the desired position so as to not interfere with later closing of the flaps.

*Transfer and exit conveyor mechanism*

After each pair of cartons has been fed from the storage hopper and filled with containers, they proceed rearwardly to a third station of chains 18 on the framework wherein they are transferred to an exit conveyor which carries each carton individually along devices that fold and glue the end flaps at both sides of the machine. The exit conveyor delivers the cartons to a delivery conveyor, not shown in the detailed drawings, which delivery conveyor is illustrated schematically at the far right of FIGURE 16. In order to move the cartons individually from their paired locations on the intermittently moving conveyor, it is necessary to use a transfer mechanism to temporarily immobilize one carton of each pair while the other is being engaged by the exit conveyor mechanism.

The exit conveyor is carried at the rear of the machine seen to the right in FIGURE 3. It extends between an upright frame extension generally designated as 99. The exit conveyor is composed of two transversely spaced chains 101, the chains 101 being inwardly adjacent to the rear ends of the intermittently moving conveyor chains 18 previously described. Chains 101 are entrained about large lower sprockets 102 fixed to a shaft 103 suitably journalled on the frame extension 99. The chains 101 also are entrained over two upper sprockets 104 fixed to a shaft 105 also rotatably journalled on the frame extension 99 and finally are entrained about rear sprockets 106 on a shaft 107. The forward flight of each chain 101 is held in a vertical position between fixed upright guides 99a intermediate the ends of the frame extension 99.

Figure 2:
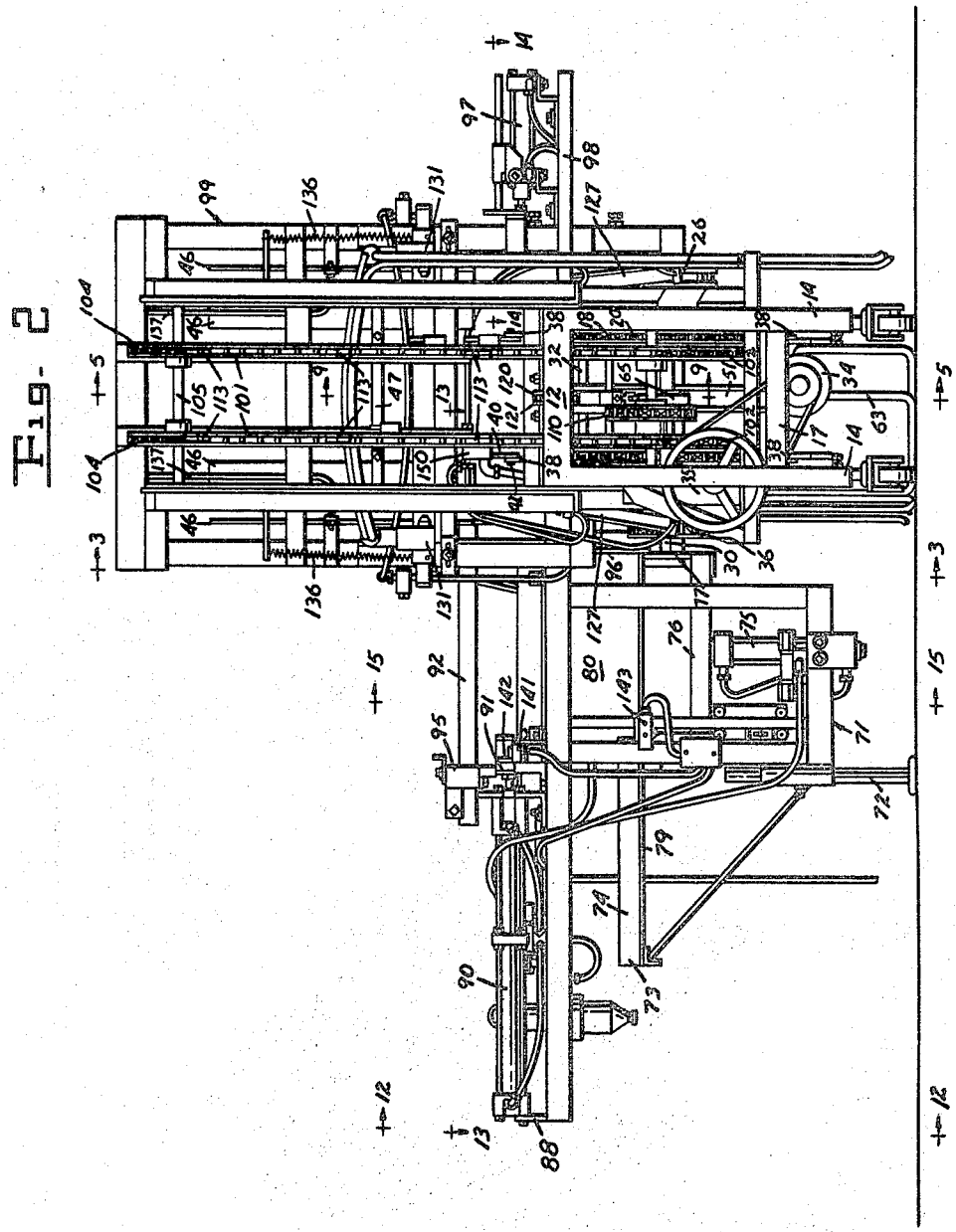
FIGURE 2 is an end view opposite to FIGURE 1 viewed from its front end.
Figure 10:
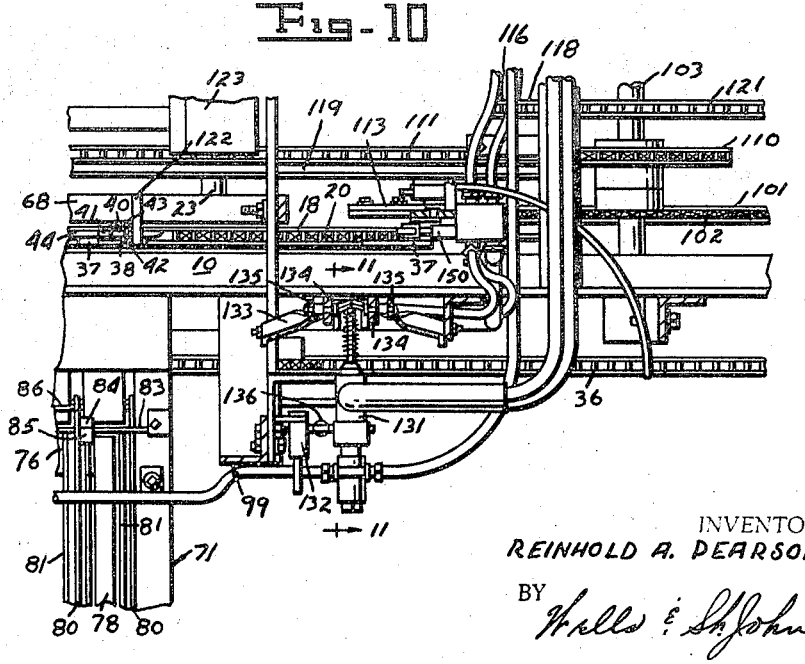
FIGURE 10 is an enlarged fragmentary sectional view through the carton flap handling apparatus as seen along line 10—10 in FIGURE 3.

Chains 101 are powered from the cross shaft 30. A sprocket 108 (FIGURE 6A) is fixed to the shaft 30 and drives a connecting chain 111. Chain 111 powers a sprocket 110 on the lower shaft 103 carrying the large sprockets 102 (FIGURES 2 and 10). Therefore, the lower sprockets 102 and the chains 101 will be moved continuously by the continuous rotation of the shaft 30.

Chains 101 are driven in unison since the respective pairs of sprockets 102, 104, and 106 are all fixed to the shafts on which they are mounted. Each chain 101 carries a plurality of longitudinally spaced brackets 113 which protrude outwardly from the chain at perpendicular angles, the brackets 113 being adapted to lift individual cartons transferred from the intermittently moving conveyor that carries the paired cartons rearwardly along the framework. The spacing and timing of the brackets 113 on the chains 101 is such that two brackets 113 will traverse upwardly across the horizontal plane of the forward flights of the chains 101 during each period in which the conveyor chains 18 are stationary and therefore during which a pair of cartons are held at the third station of chains 18 along the length of the framework.

To provide a transition between the intermittently movable conveyor chains 18 and the constantly moving exit conveyor chains 101, a pair of constantly moving friction belts 119 are utilized, the belts 119 being transversely spaced between the chains 18 and 101 as seen in FIGURES 6A and 6B. The belts 119 are entrained about front and rear pulleys 114, 115 fixed respectively to front and rear shafts 116, 117 rotatably carried on the main supporting framework. The upper horizontal flight of each belt 119 has a top surface just slightly above the top edges of bars 44 and members 10 on which the cartons rest while engaged by the posts 37 and 38 on chains 18. Therefore, the lower surfaces of the cartons, when located in the third station along the length of the framework, will be frictionally engaged by the constantly moving belts 119.

The belts 119 are powered by a sprocket 118 fixed to the front shaft 116. A connecting chain 121 is entrained about a sprocket 120 on shaft 107 (FIGURE 5).

Since the two cartons held at the station must be individually transferred to the exit conveyor, it is necessary to temporarily arrest the movement of the rear carton while the forward carton of each pair is being lifted by the upwardly moving brackets 113 that will come in contact with its lower surface. The rear carton will be released by the rear hooks 40 on post 38 by engagement of hooks 40 beneath cross bars 122 on the retaining strips 68 (FIGURES 3 to 5). However, the upper surface of the rear carton of the pair at this third station will remain in contact with retaining strips 68, which will prevent upward movement of this carton. The lower surface of the carton is relieved of frictional contact with belts 119 by a movable pad 123 best shown in FIGURE 9. The pad 123 is located between the belts 119 and has a top horizontal surface adapted to support the rear filled carton of the pair.

The lower end of the pad 123 is fixed to a pivot shaft 124 journalled on the framework, the shaft 124 being pivotally actuated by a lever 125 and cam 126 contacted thereby (FIGURE 3). Cam 126 is fixed to shaft 30.

*Flap closing mechanism*

As each carton is carried upwardly along the frame extension 99, the end flaps at both sides of the machine must be folded and glued to seal the carton with the containers inside. Since the apparatus for manipulating and glueing the flaps is identical at each side of the machine, only one side will be described herein.

Figure 11:
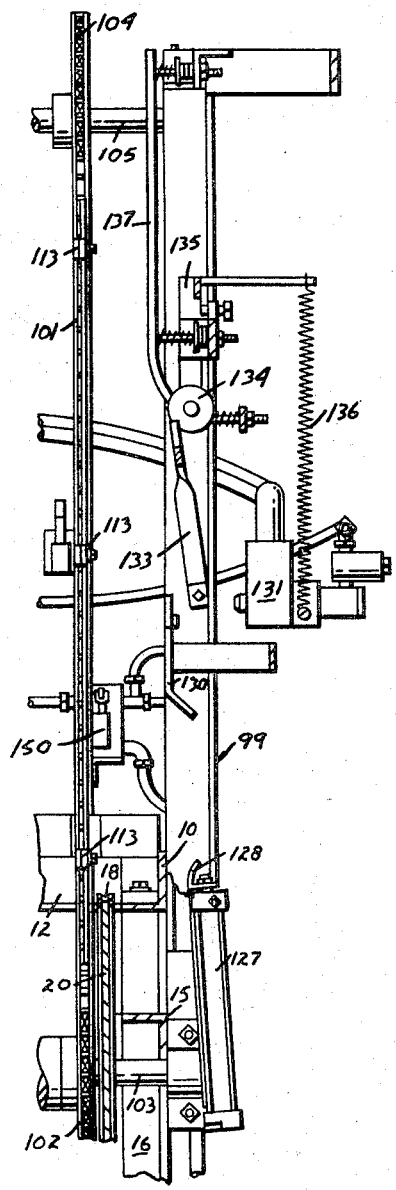
FIGURE 11 is a fragmentary sectional view seen along line 11—11 in FIGURE 10.
Figure 12:
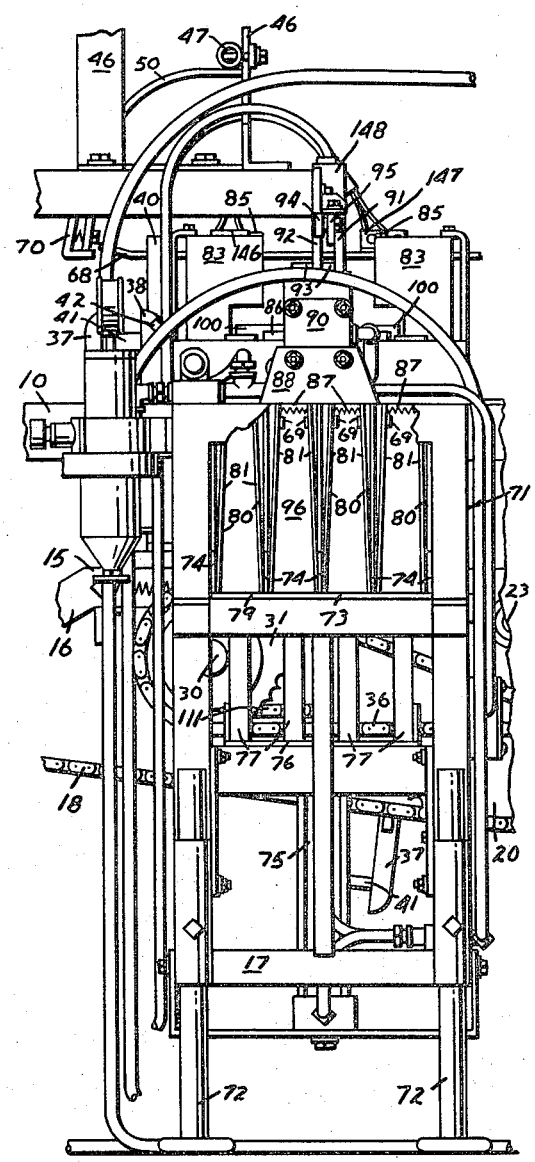
FIGURE 12 is an enlarged side view of the carton loading apparatus sa seen along line 12—12 in FIGURE 2; the remainder of the machine being broken away.

The devices used in manipulating the flaps can best be understood from the disclosure of FIGURES 7 and 9 through 11. At the lower portion of the frame extension 99 a cylinder assembly 127 is mounted at a slightly inwardly directed angle, the cylinder piston rod being directed upwardly (FIGURE 11). The end of the piston rod for the double acting pneumatic cylinder 127 carries a longitudinal plate 128 having an outwardly directed upper flange. The plate 128, when forced outwardly from the cylinder assembly 127, is adapted to bend the lower carton flaps upwardly to a position normal to the carton wall. This is accomplished just as each carton is lifted by contact with a pair of brackets 113 on the exit conveyor chains 101. The plate 128 will remain in its raised position to prevent the lower flap from folding outwardly, until the lower flap is contacted by a fixed vertical plate 130 mounted on frame extension 99. Vertical plate 130 has an outwardly directed lower flange and is adapted to bend the upper flap downwardly as the carton is carried upwardly by the conveyor chains 101. Directly above the plate 130 is an inwardly directed spray gun 131 adapted to apply glue to the folded upper and lower carton flaps in any desired pattern. The gun 131 is fixed on a bracket 132 fixed to frame extension 99.

A plow 133 fixed to the frame extension 99 is utilized to fold the side flaps toward the center of the carton and against the top and bottom flaps as the carton continues upwardly on the conveyor chain 101. The plow 133 is simply an upwardly and inwardly directed bracket of a V-shaped configuration, the sides of the bracket being twisted intermediate their ends to intersect and gradually force each side flap to a position perpendicular relative to the carton walls.

Finally, the folded flaps are contacted by two rollers 134 mounted on a pivoted bracket 135 and biased inwardly by a tension spring 136 anchored to the glue gun 132 (FIGURE 11). The flaps then pass against a spring biased pad 137 which exerts pressure on the newly glued surfaces and insures that the adhesive has an opportunity to cure in contact with the folded flaps prior to exit of the carton at the top of the frame extension 99.

*Operation and controls*

The overall operation of the machine can best be understood from FIGURES 16 through 19. These schematic views illustrate the general operations utilized in handling cartons 138 and containers 140. In the example given, the cartons 138 are "12-pack" open cartons with a central divider, the cartons being adapted to hold six bottles at each side of the central divider. The carton is sealed at both of its ends to complete the package. The carton blank is self-opening when drawn between the guides previously disclosed.

While all of the various operations described below are carried out simultaneously at different stations along the framework, they will be described in the sequence involved in completing the handling and filling of a single pair of cartons. As can be seen in FIGURE 16, while one pair of cartons is being pulled from the storage hopper at the rear of the machine, another pair of cartons is being filled, another is being transferred to the exit conveyor, another pair of cartons is being glued and sealed, while still a final pair are being carried off by the delivery conveyor at the front of the machine. At the same time, a charge of containers or bottles is being readied for insertion into the cartons being pulled from the storage hopper and more incoming containers are being fed to the container handling mechanism.

The conveyor chains 18, having posts 37 and 38 fixed to them, move intermittently along the framework, stopping periodically at the several stations illustrated in FIGURE 16 and shown in detail in the previously described drawings. The operations carried out on the container are effected during the periods at which the chains 18 are stationary. At this time, cam 65 will cause valve 66 to raise the piston rod of the cylinder assembly 51 (FIGURE 8). Upward movement of the plate 53 carrying the vacuum cups 54 will allow closure 57 for vacuum breaker 56 to seal and insure the application of vacuum pressure at cups 54.

Cups 54 will be raised until they contact the bottom walls of two adjacent carton blanks 138 resting on the rods 47 of the storage hopper. Cam 65 will then reverse valve 66 and the cylinder assembly 51 will draw the vacuum cups 54 and carton blanks 138 downwardly, causing the respective carton sides to be erected to vertical positions due to contact with the forming plates 50. The hooks 40 on the posts 38 of chains 18 will yield to permit passage of the rear carton wall, and will then snap back forwardly to engage the upper rear corner of the pair of cartons 138. In the same manner, the spring biased plates 70 on the forward forming plate 50 will yield in a forward direction and spring back to engage the forward upper surface of the front carton 138.

Subsequent movement forward of the chains 18 will cause the expanded cartons 138 to move to the second station on the framework illustrated at FIGURE 16 directly above the constantly moving belts 119. However, cartons 138 cannot move, even though frictionally engaged by the belt 119, since they are held by the stationary posts 37 and 38 on chains 18. The abutment of the front surface of the forward carton 138 by post 37 plus the abutment of the rear surface of the rear carton 138 by post 38 and hooks 40 insures the proper upright rectangular configuration of cartons 138 for filling purposes.

Figure 19:
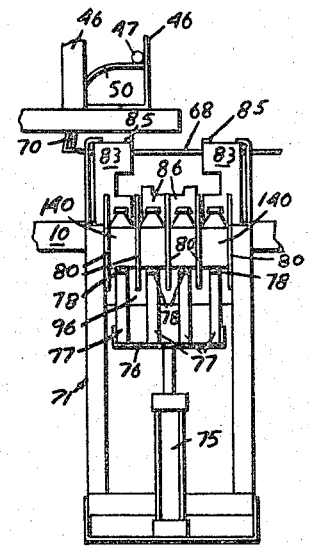

While the cartons 138 were being pulled from the storage hopper as shown in FIGURE 16 at the left side of the figure, a charge of containers 140 was being lifted by the cylinder assembly 75 in the manner shown in FIGURE 19. The upward movement of uprights 77 and the horizontal bars 78 causes the containers to be pushed beyond the longitudinal hinged plates 81, which then return to their normal positions so as to be capable of supporting the containers 140 after retraction of the cylinder assembly 75. After retraction of cylinder assembly 75, the bars 78 are again in their lowered position adapted to receive containers 140 from the conveyor extension 73 in the manner shown in FIGURE 18.

The operation of cylinder assembly 75 is tied to the operation of the horizontal pushing cylinder assembly 90 by means of a switch 141 mounted on frame 71 and tripped by a bracket 142 on pusher element 91 (FIGURE 13). The switch 141 is tripped during rearward movement of bracket 142 past its pivoted actuator. This causes the cylinder assembly 75 to raise the elevator 76. Motion of cylinder assembly 75 is reversed by actuation of a second switch 143 mounted at the side of frame 71 and contacted by an outwardly protruding bracket 144 on the elevator 76 (FIGURE 2). The switches 141 and 143 operate a solenoid controlled valve of conventional design and no further detail relative to this control system is believed necessary. The cylinder assembly 75 will therefore be raised and lowered following retraction of the horizontal cylinder assembly 90. It will not again be raised until the bracket 142 has moved to an inner position during pushing of containers and has again tripped the switch 141 during rearward movement.

The operation of the horizontal cylinder assembly 90 is controlled be three switches wired in series. The first switch is shown in FIGURE 13 almost opposite to switch 141 and is designated by the numeral 145. The remaining two switches are best seen in FIGURE 3 and are mounted on the retaining strip 68 adjacent to the bottle delivery mechanism. They are designated by the numerals 146 and 147 and are actuated when erected cartons are located beneath them in contact with the retaining strips 68. Switch 145 is actuated by contact with the rear surface of the pusher element 91. The solenoid controlled valve actuated by these three switches is reversed to cause expansion of cylinder assembly 90 after the pusher element 91 has reached its outer position to contact switch 145 and after two cartons 138 are in position beneath the respective switches 146, 147. The cylinder assembly 90 is operated by the same valve in unison with cylinder assembly 97, and these cylinders will be expended to move the respective pusher element 91 and positioning plates 100 after closing of switches 145, 146, 147.

Figure 17:
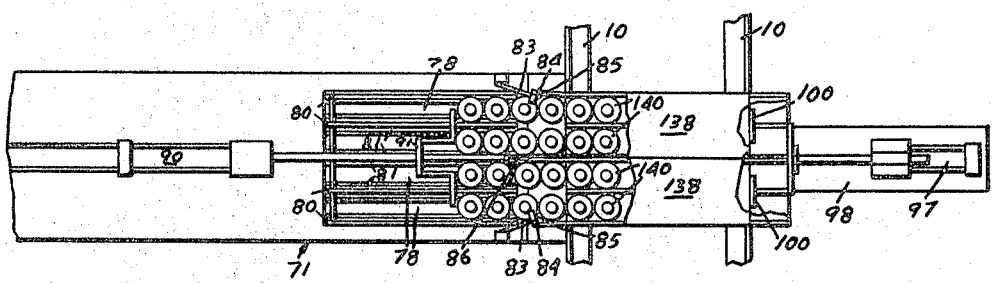

When the cylinder assemblies 90 and 97 are expanded, a charge of 24 bottles 140 will be pushed past the gates 83, 86 and into the open cartons 138 in the manner shown in FIGURE 17. The positioning plates 100 will prevent the containers from moving beyond that location desired within the cartons 138, and the pusher element 91 will cause the bottles to be properly located within the cartons 138. The air supply to the double acting cylinder assemblies 90 and 97 will be reversed upon contact of bracket 95 with a switch 148 mounted in its path on the main framework (FIGURE 6A). Reversal of cylinder assembly 90 will eventually cause the switch 141 to be tripped to place another charge of bottles on the top edges of plates 81 and will also cause the switch 145 to be closed. However, during reversal of the cylinder assembly 90, the cartons 138 will be moved to a forward position so that at least one of the switches 146, 147 will be open until a new pair of cartons 138 are in proper stationary position for reception of the next charge of bottles.

After the filled cartons have proceeded to the third station located forwardly on the main framework, they will again be held in a stationary position due to the intermittent movement of chains 18. At this position, the cross bars 122 on retaining strips 68 will release the rear hooks 40. At the same time, the lifting pad 123 will be raised by actuation of cam 126 to prevent further movement of the rear filled carton 138.

The forward carton will immediately be lifted by a pair of brackets 113 on the constantly moving chains 101. Immediately after the upward movement of the carton 138 has begun, a switch 150 on the frame extension 99 (FIGURE 11) will be tripped by contact with the carton. Switch 150 is wired to a valve controlled thereby adapted to expand the cylinders 127 and cause the plates 128 to close the lower flaps at each end of the carton 138. At the same time, contact of the upper flaps with the stationary plates 130 will fold them downwardly. The flaps will be held in their closed positions by contact with the plates 130 during application of glue from the gun 131. The continued upward movement of the container will result in closing of the side flaps by contact with the plows 133, the rollers 134 and pad 137 serving to maintain the closed flaps in their required position during initial setting of the adhesive.

As soon as the forward carton 138 has been lifted clear of the area forward of the rear carton 138, the pad 128 will be lowered by release of lever 125 on cam 126, allowing the rear carton 138 to move forwardly on the belts 119, where it will be handled in the same manner as the previously described carton. The finished cartons, filled and sealed, will pass over the top of the exit conveyor chains 101 in the manner seen in FIGURE 16 and can be received on a delivery conveyor or other device.

Various modifications can obviously be utilized in the present combination. The application is not restricted to any particular type of adhesive, and the substitution of a "hot melt" adhesive system for the liquid system illustrated is most beneficial in certain instances. In other applications, a combination of the two types of systems might be utilized. Mechanical changes can be made in various mechanisms without deviating from the basic concept and the operation of the various parts as described. For these reasons, only the following claims are intended to limit or restrict the scope of this invention.

Having thus described my invention, I claim:

1. An apparatus for handling and filling cartons, comprising:
 a rigid supported framework;
 movable conveyor means on said framework adapted to transfer erected cartons longitudinally along said framework, said movable conveyor means including an intermittently movable conveyor operable to transfer directed cartons between successive stations located longitudinally along the length of said framework;
 carton blank storage means on said framework adjacent to a first of said stations of said conveyor;
 carton forming means fixed to said framework adjacent said first stations of said conveyor;
 carton feed means on said framework to grasp individual blanks in said storage means in cooperation with said carton forming means to thereby erect said carton to a rectangular configuration and to place it on said conveyor;
 driving means on said framework operatively connected to said conveyor to intermittently move said conveyor relative to said framework to transfer directed cartons supported thereon between said stations;
 carton filling means on said framework adjacent a second of said stations to place a charge of material within each erected carton located at said second station;
 and carton flap closing and sealing means on said framework located beyond said second station to close and seal flaps of filled cartons.

2. An apparatus as defined in claim 1, wherein said intermittently movable conveyor comprises:
 a carton supporting surface on said framework on which erected cartons rest;
 endless movable conveyor elements having a flight thereof extending longitudinally along said surface;
 and longitudinally spaced posts fixed to said conveyor elements, said posts projecting outward of said surface along said flight to locate erected cartons longitudinally on said surface.

3. An apparatus as defined in claim 1, wherein said intermittently movable conveyor comprises:
 a carton supporting surface on said framework on which erected cartons rest;
 endless movable conveyor elements having a flight thereof extending longitudinally along said surface;
 longitudinally spaced posts fixed to said conveyor elements, said posts projecting outward of said surface along said flight to locate erected cartons longitudinally on said surface;
 said posts including hooks yieldably mounted thereon and protruding outwardly therefrom, said hooks having a carton engaging surface facing said carton supporting surface and adapted to engage a carton wall opposite to the carton wall resting on said carton supporting surface.

4. An apparatus as defined in claim 1 wherein said carton filling means comprises:
 container supply conveyor means on said framework to direct containers toward said framework in longitudinal rows, the elevation of said container supply conveyor means being vertically offset from that of said intermittently movable conveyor;
 vertically movable elevator means on said framework to selectively receive containers from said container supply means, said elevator means being vertically adjustable so as to selectively transfer containers from the elevation of said container supply conveyor means to that of said intermittently movable conveyor;
 container support means on said framework adapted to receive containers shifted to the elevation of said intermittently movable conveyor by said container elevator means;
 and power operated means on said framework to transfer containers from said container support means to the interior of erected cartons located by said intermittently movable conveyor at said second station.

5. An apparatus as defined in claim 1, wherein said intermittently movable conveyor comprises:
 a carton supporting surface on said framework on which erected cartons rest;

endless movable conveyor elements having a flight thereof extending longitudinally along said surface;

longitudinally spaced posts fixed to said conveyor elements, said posts projecting outward of said surface along said flight to locate erected cartons longitudinally on said surface;

said posts including hooks yieldably mounted thereon and protruding outwardly therefrom, said hooks having a carton engaging surface facing said carton supporting surface and adapted to engage a carton wall opposite to the carton wall resting on said carton supporting surface;

and means on said framework operatively engageable with said hooks at a third station along said intermittently movable conveyor to thereby move said hook relative to the post on which it is mounted.

6. An apparatus as defined in claim 1, wherein said intermittently movable conveyor comprises:

a carton supporting surface on said framework on which erected cartons rest;

endless movable conveyor elements having a flight thereof extending longitudinally along said surface;

longitudinally spaced posts fixed to said conveyor elements, said posts projecting outward of said surface along said flight to locate erected cartons longitudinally on said surface;

said posts including hooks yieldably mounted thereon and protruding outwardly therefrom, said hooks having a carton engaging surface facing said carton supporting surface and adapted to engage a carton wall opposite to the carton wall resting on said carton supporting surface;

means on said framework operatively engageable with said hooks at a third station along said intermittently movable conveyor to thereby move said hook relative to the post on which it is mounted;

a constantly moving horizontal conveyor on said framework having a carton supporting flight overlapping the front end of the flight of said intermittently movable conveyor in the direction of its movement relative to said framework, said constantly moving conveyor having a carton supporting surface above said carton supporting surface of said intermittently movable conveyor;

and movable means on said framework selectively engageable with an erected carton resting on said moving horizontal conveyor to temporarily prevent movement of the engaged carton due to contact thereof by said constantly moving conveyor.

7. An apparatus for handling and filling cartons, comprising:

a rigid supported framework;

movable conveyor means on said framework adapted to transfer erected cartons longitudinally along said framework, said movable conveyor means including an intermittently movable conveyor operable to transfer (directed) erected cartons between successive stations located longitudinally along the length of said framework;

a carton blank storage hopper fixed to said framework adjacent to said intermittently movable conveyor, the discharge opening of said hopper being spaced from and directed toward a first of said stations;

carton forming means comprising:

converging forming plate means on said framework interposed between said hopper and said conveyor to engage a carton blank and to force each blank to an erected rectangular configuration during transfer of the blank from said hopper to said conveyor;

and movable carton grasping means on said framework to releasably grasp one wall of a carton blank in said hopper and to transfer the carton blank to said conveyor through said forming plate(s) means.

8. An apparatus as defined in claim 7, wherein said intermittently movable conveyor comprises:

a carton supporting surface on said framework on which erected cartons rest;

endless movable conveyor elements having a flight thereof extending longitudinally along said surface;

and longitudinally spaced posts fixed to said conveyor elements, said posts projecting outward of said surface along said flight to locate erected cartons longitudinally on said surface.

9. In an apparatus for setting up and handling cartons, an intermittently movable conveyor for erected cartons comprising:

a fixed supporting framework;

a carton supporting surface on said framework on which erected cartons rest;

endless movable conveyor elements having a flight thereof extending longitudinally along said surface;

and longitudinally spaced posts fixed to said conveyor elements, said posts projecting outward of said surface along said flight to locate erected cartons longitudinally on said surface.

10. An apparatus as defined in claim 9 wherein certain of said posts have mounted thereon yieldable hooks having a carton engaging surface normally parallel to and facing said carton supporting surface on said framework.

11. In an apparatus for setting up and handling cartons, an intermittently movable conveyor for erected cartons comprising:

a fixed supporting framework;

a horizontal fixed carton supporting surface on said framework on which the lower surfaces of erected cartons rest;

an endless movable conveyor element mounted on said framework for motion relative thereto, said element having an upper horizontal flight adjacent to and slightly below said carton supporting surface;

longitudinally spaced posts fixed to said conveyor element and projecting upwardly therefrom beyond said surface along said upper flight, said posts being located in pairs to abut respectively the front and rear surfaces of erected cartons resting on said carton supporting surface;

an outwardly protruding hook yieldably mounted on the rear post of each pair about a horizontal transverse axis, said hook having a normally horizontal surface extending forwardly therefrom at an elevation above said carton supporting surface equal to the height of erected cartons resting thereon.

12. The conveyor apparatus as defined in claim 11, further comprising:

a fixed bracket on said framework mounted in the path of said hooks adapted, when contacted thereby, to move the horizontal surface thereof relative to said conveyor during motion of said conveyor relative to said framework.

13. The conveyor apparatus as defined in claim 11, further comprising:

drive means on said framework operatively connected to said conveyor element to intermittently move said conveyor element relative to said framework, said pairs of posts being held stationary between such movement at fixed stations spaced longitudinally along said carton supporting surface;

and means on said framework engageable with said hooks at one of said stations along the framework to move said hook relative to said conveyor element to thereby release a carton contacted thereby.

14. The conveyor apparatus as defined in claim 11, further comprising:

drive means on said framework operatively connected to said conveyor element to intermittently move said conveyor element relative to said framework, said pairs of posts being held stationary between such movement at fixed stations spaced longitudinally along said carton supporting surface;

means on said framework engageable with said hooks at one of said stations along the framework to move said hook relative to said conveyor element to thereby release a carton contacted thereby;

and a constantly moving conveyor on said framework having a carton supporting flight overlapping the front end of the upper horizontal flight of said conveyor element, said carton supporting flight being above said carton supporting surface;

said last named means engageable with said hooks being located adjacent to the front end of the upper horizontal fiight of said conveyor element.

15. The conveyor apparatus as defined in claim 11, further comprising:

drive means on said framework operatively connected to said conveyor element to intermittently move said conveyor element relative to said framework, said pairs of posts being held stationary between such movement at fixed stations spaced longitudinally along said carton supporting surface;

means on said framework engageable with said hooks at one of said stations along the framework to move said hook relative to said conveyor element to thereby release a carton contacted thereby;

a constantly moving conveyor on said framework having a carton supporting flight overlapping the front end of the upper horizontal flight of said conveyor element, said carton supporting flight being above said carton supporting surface;

said last named means engageable with said hooks being located adjacent to the front end of the upper horizontal flight of said conveyor element;

and movable means on said framework selectively engageable with cartons released from said hooks to temporarily prevent motion of the cartons due to contact by said constantly moving conveyor.

16. Container handling means for feeding a charge of containers to the interior of an open end carton, comprising:

a rigid supporting framework;

a container supply conveyor on said framework, the elevation of said container supply conveyor being below that of the carton to which containers are to be fed;

elevating means mounted on said framework at the delivery end of said conveyor having an upper surface to collect and support the desired arrangement of containers required within a carton;

container supporting means yieldably mounted on said framework in vertical alignment with said elevator means including container supporting surfaces normally located in a plane substantially coplanar with the bottom wall of the carton to be filled;

and means on said framework to transfer a charge of containers from said container supporting surfaces to the interior of a carton.

17. Container handling means as defined in claim 16, further comprising:

power means on said framework operatively connected to said elevator means to selectively shift the upper surface of said elevator means between an elevation coplanar with the delivery end of said container supply conveyor and an elevation above the carton supporting surface of said carton supporting means.

18. Container handling means as defined in claim 16 further comprising:

container flap retaining means movably mounted on said framework engageable with the outwardly protruding flaps of a carton infeed end during transfer of a charge of containers to the carton by said last named means.

19. Container handling means for arranging a charge of containers prior to delivery of the containers to a carton comprising:

a rigid supporting framework on which an open end carton is fixedly located;

a container supply conveyor on said framework having a delivery end thereof at an elevation on said framework below that of the carton location;

elevator means movably mounted on said framework adjacent to the delivery end of said container supply means having a discontinuous top surface made of parallel bars, said bars each being of a width less than the width of a row of containers and spaced relative to one another equally to the spacing of adjacent rows of containers;

container supporting means yieldably mounted on said framework above and in vertical alignment with said elevator means including movable members parallel to said bars and carried on said framework, said movable members being arranged in pairs to normally permit passage of said bars vertically between them, the spacing between the upper surfaces of said movable members being normally less than the width of a row of containers, the elevation of said upper surfaces being substantially equal to that of the carton location;

and means on said framework to selectively transfer a charge of containers from said upper surfaces to the interior of an open end carton at said carton location.

20. Container handling means as defined in claim 17, further comprising:

power means on said framework operatively connected to said elevator means to selectively shift the upper surface of said elevator means between an elevation coplanar with the delivery end of said container supply conveyor and an elevation above the carton supporting surface of said carton supporting means.

21. A container handling apparatus comprising:

a rigid supporting framework;

a container receiving station for the reception of a plurality of container rows in a side by side arrangement, said container receiving station, comprising:

a plurality of fixed vertical dividers on said framework parallel to and transversely spaced from one another, the spacing between adjacent dividers being slightly greater than the desired center-to-center spacing between container rows;

yieldable container supports mounted on said framework below the upper ends of said dividers, said supports normally projecting inward between each pair of dividers a distance less than the separation between adjacent dividers;

and vertically movable elevator means on said framework beneath said station to selectively direct prearranged rows of containers between each pair of dividers to an elevation above the upper surfaces of said yieldable container supports and to deposit the container thereon.

References Cited

UNITED STATES PATENTS

| | | | |
|---|---|---|---|
| 1,515,589 | 11/1924 | Beckmann | 53—250 |
| 1,661,969 | 3/1928 | Semashko | 53—249 |
| 2,896,520 | 7/1959 | Woelfer | 53—186 X |
| 2,961,811 | 11/1960 | Norwood | 53—37 |
| 3,039,248 | 6/1962 | Jones | 53—186 X |

GRANVILLE Y. CUSTER, JR. *Primary Examiner.*